United States Patent
Kivari et al.

Patent Number: 5,396,653
Date of Patent: Mar. 7, 1995

[54] CELLULAR TELEPHONE SIGNALLING CIRCUIT OPERABLE WITH DIFFERENT CELLULAR TELEPHONE SYSTEMS

[75] Inventors: Raimo Kivari, Haukipudas; Juha Pikkarainen, Oulu, both of Finland

[73] Assignee: Nokia Mobile Phones Ltd., Salo, Finland

[21] Appl. No.: 893,769

[22] Filed: Jun. 5, 1992

[51] Int. Cl.$^6$ .................. H04B 1/40; H04B 7/26; H04Q 7/04
[52] U.S. Cl. .................. 455/88; 455/33.1; 455/70; 379/59
[58] Field of Search .......... 455/33.1, 33.4, 88, 455/38.3, 68, 70, 54.1, 56.1; 375/38; 379/59

[56] References Cited

U.S. PATENT DOCUMENTS

| | | | |
|---|---|---|---|
| 4,984,290 | 1/1991 | Levine et al. | 455/54.1 |
| 5,020,092 | 5/1991 | Phillips et al. | 379/59 |
| 5,020,093 | 5/1991 | Pireh | 379/59 |
| 5,127,042 | 6/1992 | Gillig | 379/59 |
| 5,175,872 | 12/1992 | Borras | 455/33.1 |
| 5,187,809 | 3/1993 | Rich et al. | 455/33.1 |
| 5,228,074 | 7/1993 | Mizikovsky | 455/33.1 |

FOREIGN PATENT DOCUMENTS

| | | |
|---|---|---|
| 1360400 | 7/1974 | United Kingdom . |
| 2221819A | 2/1990 | United Kingdom . |
| 2231468A | 11/1990 | United Kingdom . |
| 2239375A | 6/1991 | United Kingdom . |

*Primary Examiner*—Curtis Kuntz
*Assistant Examiner*—Mark D. Wisler
*Attorney, Agent, or Firm*—Perman & Green

[57] ABSTRACT

Apparatus operable with different cellular telephone systems and signalling protocols is described. Signalling messages, both data messages and supervisory related signals between a cellular telephone microcontroller (4) and a base station are transferred via a baseband signalling circuit (10). The baseband signalling circuit is operable to employ different signalling protocols, the protocol being selected by control bits provided from the microcontroller to the signalling circuit. In a preferred embodiment, the signalling protocol selection is made between an AMPS/TACS signalling protocol and a NAMPS/NTACS subaudible signalling protocol.

18 Claims, 7 Drawing Sheets

| DSAT | WSYNC | DATA WORD | DST/DSAT |
|------|-------|-----------|----------|
| 24 | 30 | 40/48 | 24 |

DATA WORD: 40 bits - FVC }  100 bits/sec MANCHESTER
              48 bits - RVC }  (12-bit parity)

WSYNC: 30 bits - FVC }  200 bits/sec NRZ
             - RVC }  (195A99A6 hex)

DSAT: 24 bits - FVC }  200 bits/sec NRZ
           - RVC }  (1 of 7 sequences)

DST: 24 bits - FVC }  200 bits/sec NRZ, (DSAT)
         - RVC }

CONTROL TONES

CELLULAR TELEPHONE SIGNALLING CIRCUIT OPERABLE WITH DIFFERENT CELLULAR TELEPHONE SYSTEMS

FIELD OF THE INVENTION

This invention relates generally to cellular telephone signalling protocols and, more particularly, to dual-mode or multi-mode cellular telephones capable of changing a signalling protocol according to a mode selection so as to operate with different cellular telephone systems.

BACKGROUND OF THE INVENTION

FIG. 1 is a simplified block diagram showing a signalling path of a cellular telephone. An antenna 1 is coupled to a radio frequency (RF) block 2. Antenna 1 both receives and transmits RF signals for accomplishing a telephone conversation. A Baseband Signaling Circuit (BSC) 3 is interposed between the RF block 2 and a controller, typically implemented as a microprocessor based controller (microcontroller) 4. BSC 3 outputs an analog signal (Tx) 2a to the RF block 2, Tx 2a being used to modulate a suitable RF carrier. BSC 3 receives an analog signal (Rx) 2b. Rx 2b represents a demodulated RF signal that is received by antenna 1. Communication between BSC 3 and the microcontroller 4 is by digital data, including an Interrupt signal line 3a, an address bus 4a, and a data bus 4b. In operation, the BSC 3 and the microcontroller 4 implement a selected signalling protocol when transmitting and receiving a telephone communication.

A conventional Advanced Mobile Phone Services (AMPS), and also a Total Access Communication System (TACS), signalling protocol and format is described in Appendix A of the Specification.

As described in Appendix A and FIG. 7, for a Forward Control Channel (FCC or FOCC) and a Reverse Control Channel (RCC or RECC) signalling protocol, the FOCC signalling is a continuous bit stream from a base station (or land station) to a mobile station. Forward and Reverse Voice Channel (FVC and RVC) signalling protocols are employed for voice channels (or speech channels). The FVC and the RVC are both burst type messages; that is, not a continuous bit stream.

Referring to FIG. 8, a Supervisory Audio Tone (SAT) and a Signalling Tone (ST) are used on the voice channel, SAT being a continuous signal from base station to mobile station, with the mobile station transponding the SAT back to the base station. The ST is a burst type signal from the mobile station to the base station.

At present, mobile telephones are not available that are operable on both the AMPS and the TACS systems. Thus, if a mobile telephone is constructed or programmed to be an AMPS telephone, it cannot be user-selected to operate also on TACS. But, the same signaling circuit can be used in both types (AMPS/TACS) telephones, and the selection of the signalling circuit may occur at initialization.

The AMPS/TACS selection of the signaling circuit can be achieved by changing the bit rate. The frame structure (both control and voice channel), and the supervisory signals (SAT and ST), are identical for both systems.

However, narrow band AMPS (NAMPS) and narrow band TACS (NTACS) present clearly different signaling protocols. A subaudible signalling protocol is employed on NAMPS voice channels. NAMPS voice channels are referred to as narrow band voice channels, because the channel spacing is substantially smaller than on an AMPS voice channel (30 Khz →10 Khz). Correspondingly similar differences exist in NTACS as compared to TACS.

The NAMPS/NTACS system is a dual-mode system. That is, mobile telephones must be operable both on AMPS/TACS—specific wide band voice channels, and on NAMPS/NTACS—specific narrow band voice channels (utilizing subaudible signaling).

The NAMPS/NTACS narrow band voice channel signalling protocol (frame) is shown in FIG. 3.

Supervisory signalling on the voice channel is realized by DSAT and DST. On voice channel mobile receivers there is utilized a continuous bit stream, Digital SAT (DSAT) 200 bit/s, NRZ-coded, which is also transponded to the base station. There may be up to seven different DSAT patterns.

Furthermore, ST is a Digital ST (DST), also 200 bits/s, NRZ. The DST signal is generated by inverting the transmitted DSAT.

Voice channel signalling is accomplished by a digital DATA WORD, which is 100 bit/s, Manchester coded. The DATA WORD does not contain repeats, as on AMPS and TACS (control and voice channels), but only one data message. The DATA WORD is preceded by a Word Sync pattern (WSYNC) which is a fixed 30-bit pattern, 200 bit/s, NRZ.

DSAT is a continuous bit stream, which can be replaced by WSYNC and DATA WORD for certain periods of time. Thus, the DATA WORD is not a burst type of transmission having its own frequency, but is instead "embedded" in the DSAT pattern.

Based on the foregoing, required NAMPS signalling functions for a mobile station include the following:

a) detecting received DSAT (NRZ) and transponding DSAT to the base station;
b) detecting WSYNC (NRZ) and DATA WORD, Manchester-decoding DATA WORD, and also BCH-decoding DATA WORD;
c) transmitting DST (NRZ) (invert transmitted DSAT); and
d) transmitting WSYNC (NRZ) and DATA WORD, DATA Manchester and BCH-coded.

As a result, several problems must be overcome to realize NAMPS signalling in a mobile station, as compared to an AMPS signalling embodiment. These problems include the following.

a) The bit rate is substantially different, i.e., significantly slower.
b) DSAT, DST and WSYNC are not Manchester-coded, but DATA WORD is, although all of these signals appear in the same continuous bit stream. Thus, DATA WORD must be encoded (transmitter) and decoded (receiver), but DSAT and WSYNC not encoded (transmitter) or decoded (receiver).
c) DATA WORD does not contain repeats. As a result, AMPS 3/5 majority voting is not required.
d) DATA WORD is "embedded" in the DSAT bit stream, and occasionally replaces the DSAT bit stream.
e) WSYNC has a different length (30 bits instead of 11 bits as found in AMPS).
f) Also, there are seven different DSAT patterns, instead of the three SAT patterns.

One known implementation of NAMPS narrow band voice channel signalling includes a conventional AMPS (TACS) signalling circuit, and also additional circuitry to accomplish NAMPS signalling, to and from the microcontroller 4 or some other controller. This approach also requires a substantial amount of additional software for the microcontroller 4.

By example, this technique can be realized by using a commercial AMPS-signalling circuit, such as the DPROC/UMA 1000, available from Philips/Signetics, for AMPS signalling, and also an additional circuit, by example a NE5234, a switch, and a microcontroller (PCB80C552) to accomplish narrow band NAMPS signaling.

However, this approach requires additional components, which increases at least component cost and also power consumption. Depending on the amount of additional circuitry to implement NAMPS, a substantial amount of additional software may also be required. Also, surface area requirements on printed circuit boards is increased, thus making it more difficult to implement a small, lightweight portable telephone.

It can thus be realized that what is required is a signalling circuit that is both area and cost effective, consumes no additional current, has an efficient interface to microcontroller software, and is operable on both AMPS/TACS and NAMPS/NTACS signalling systems.

OBJECTS OF THE INVENTION

Accordingly, it is an object of this invention to provide a signalling circuit operable with different cellular telephone systems and with different signalling protocols.

It is another object of this invention to provide a signalling circuit operable with AMPS/TACS control and voice channels, and also with NAMPS/NTACS channels, with the operational mode and function of the circuit being selected by one or more control signals.

It is another object of this invention to provide a signalling circuit which has a flexible interface to a microcontroller, so that the interface data bus bit rate, bus width, and interrupt rate may be modified during operation.

It is a further object of this invention to provide a signalling circuit that enables control of transmitted modulated signal deviation, by control signals from a microcontroller to the signalling circuit, on all systems and on both wide band and narrow band voice channels.

SUMMARY OF THE INVENTION

The invention provides a baseband signalling circuit for use with a cellular telephone, the baseband signalling circuit including an interface to a cellular telephone controller and an interface to a radio frequency reception and transmission circuit. The baseband signalling circuit is responsive to a first state of a control signal line for operating in accordance with wideband AMPS/TACS signalling protocols (greater than one kilo-Hertz), and is also responsive to a second state of the control signal line for operating in accordance with narrowband NAMPS/NTACS subaudible signalling protocols (less than one kilo-Hertz). The state of the control signal line is controlled by the cellular telephone controller.

The first interface includes a multi-bit data bus and an interrupt signal line that is coupled between the baseband signalling circuit and the cellular telephone controller. The baseband signalling circuit is responsive to information written over the data bus by the cellular telephone controller for selectively generating the interrupt signal on an occurrence of a reception of eight data bits from the second interface, or on an occurrence of a reception of one bit from the second interface.

A decoder is responsive to the first state of the control signal line for operating as a Manchester decoder for decoding AMPS/TACS data that is received from the second interface. The decoder is also responsive to the second state of the control signal line for operating as a one bit integrator for decoding NAMPS/NTACS DSAT, WSYNC, and DATA WORD information that is received from the second interface.

When operating in the narrowband mode, the control signal line is also employed to place wideband circuitry into a low power quiescent state, thereby reducing power consumption.

DETAILED DESCRIPTION OF THE INVENTION

Figure 2B:
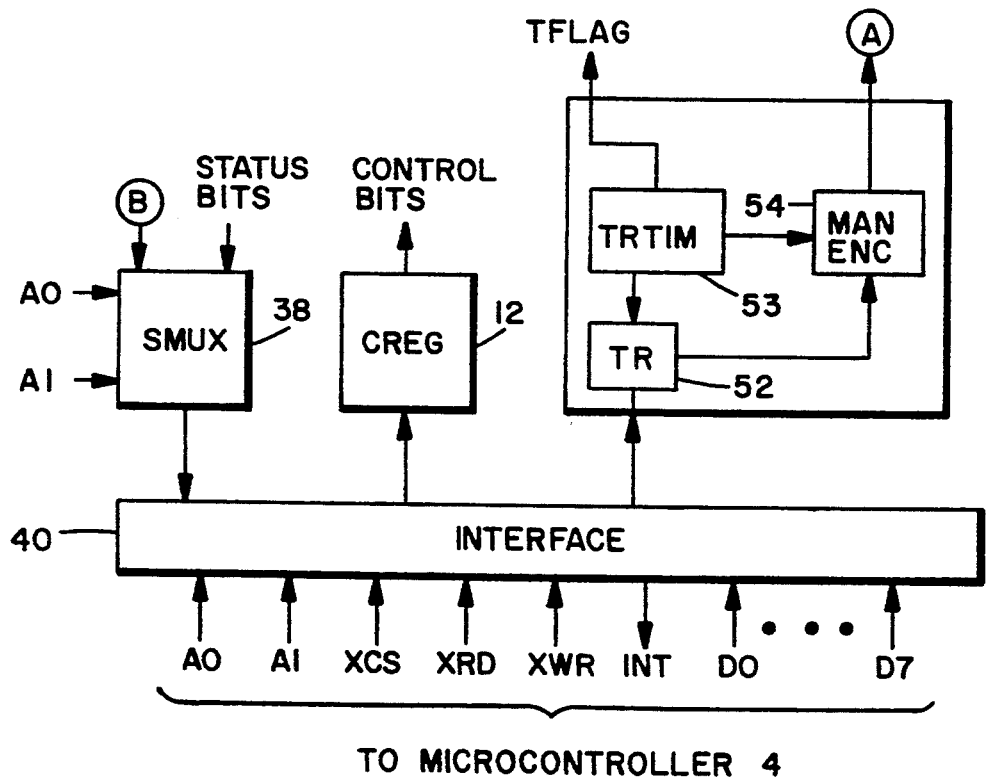
FIGS. 2a and 2b are a block diagram of an AMPS/TACS signaling circuit.
Figure 2A:
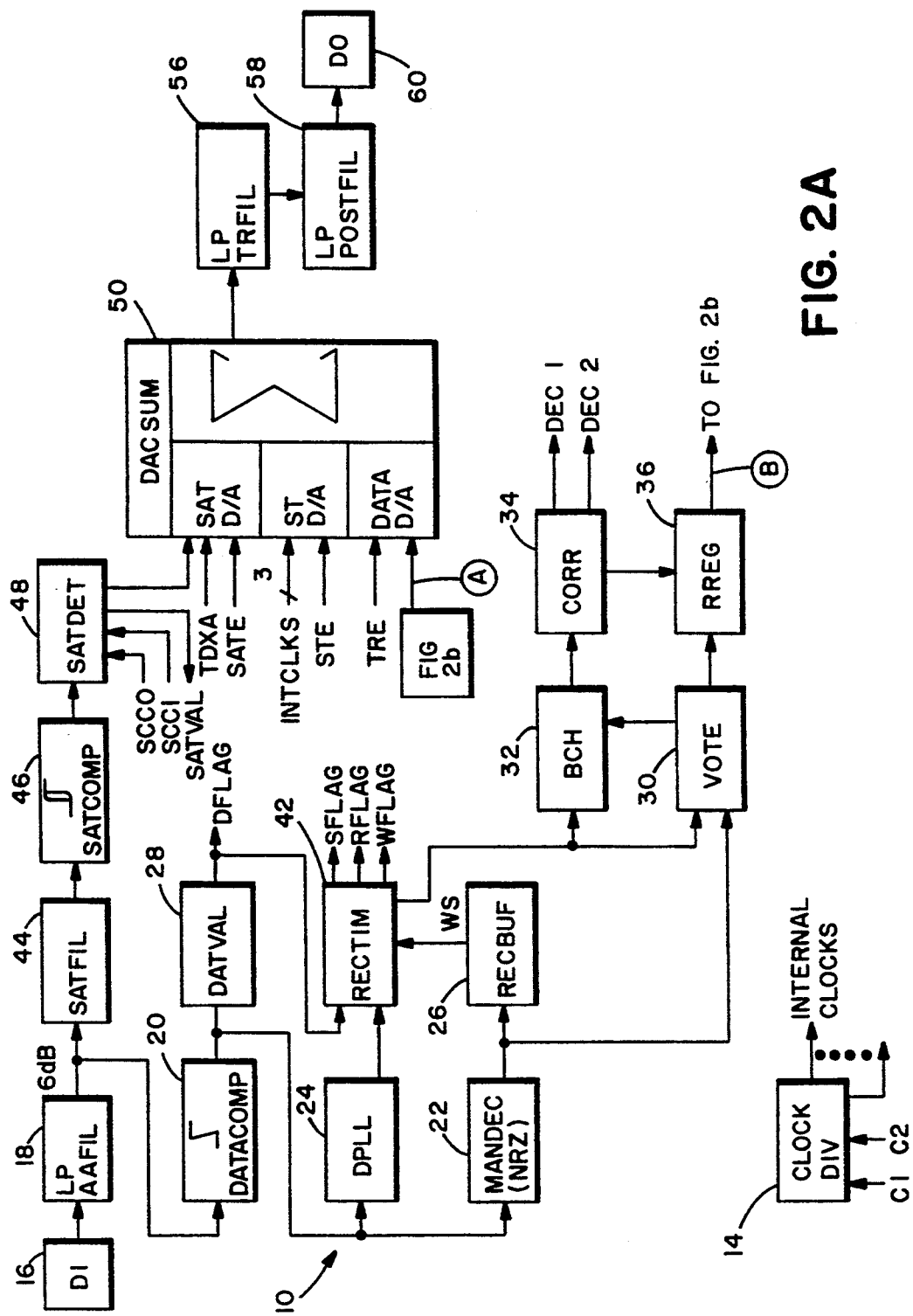

An example of a baseband signalling circuit 10 is shown in block diagram form in FIGS. 2a and 2b. The illustrated circuit operates only with AMPS/TACS control and voice channels.

A Control Register (CREG) 12 includes 8-bit registers for controlling circuit operation. Internal clocks are generated from a 4.8 Mhz clock in block CLOCKDIV 14.

An input node (DI) 16 provides an output to a low-pass filter (AAFIL) 18 which attenuates high input frequencies to prevent aliasing in subsequent switched capacitor (SC) filter stages. AAFIL 18 has a 6 dB passband gain.

The data is connected through a comparator (DATACOMP) 20 to a Manchester decoder (MANDEC) 22 which decodes the Manchester encoded data to a NRZ (Non-Return to Zero) format.

The signalling circuit 10 is synchronized to the received data with a digital Phase Locked Loop (DPLL) 24 and with a word synchronization detection logic block (RECBUF) 26.

Data validity (block DATVAL 28) is continuously monitored (status flag DFLAG), and this information is used internally by the circuit 10.

The serial data from the Manchester decoder 22 is 3/5 majority voted in block VOTE 30, Bose-Chandhuri-Hocquenghem (BCH) decoded in block 32, corrected (CORR) in block 34, and shifted into a receiver register (RREG) 36. A final data word is comprised of 28 bits. Four status bits are added to RREG 36 to make up a 32-bit register, which is read by microcontroller 4 in 8-bit increments (bytes), via status multiplexer (SMUX) 38 (FIG. 2b).

The generator polynomial for a (40, 28; 5) BCH code is:

$$gB(x) = X^{12} + X^{10} + X^8 + X^5 + X^4 + X^3 + X^0.$$

The code, a shortened version of the primitive (63, 51; 5) BCH code, is a systematic linear block code with the leading bit as the most signficant information bit and the least-significant bit as the last parity-check.

SMUX 38 outputs (a) the receiver data registers, (b) test registers (not shown), or (c) the status register to an 8-bit data bus provided at interface 40. The microcontroller 4 is connected to the 8-bit data bus for receiving the information output by SMUX 38.

Referring again to FIG. 2a, a Receiver timing block (RECTIM) 42 extracts the data from received frames on both control and voice channels and generates data transfer interrupts (WFLAG) and repeat interrupts (RFLAG). RECTIM 42 also separates the time multiplexed data streams (channel A and B) and Busy/Idle-information (XBOI) on the control channel. RECTIM 42 also maintains bit and word synchronization during different frames, and passes a synchronization status (SFLAG) forward to the status register.

The Supervisory Audio Tone (SAT) signal is filtered and amplified with a band-pass filter (SATFIL) 44. The output of SATFIL 44 is converted to a digital square wave signal by block SATCOMP 46.

SAT detection is done with a digital PLL/detection circuit (SATDET) 48. This logic compares the SCC code given by control register 12 bits SCC0 and SCC1 to the incoming SAT frequency and indicates the result with a status register bit (SATVAL). The regenerated SAT is then fed to block DACSUM 50 for transmission. Data to be transmitted is loaded into a transmitter register (TR) 52. From the TR 52 the data is converted to serial form, serially shifted to a Manchester encoder (MANENC) 54, and then inputted to DACSUM 50.

The sending of ST is controlled with a control register bit STE that is fed to DACSUM 50.

DACSUM 50 generates the analog output signals (ST, SAT and wide band data) from the digital inputs, and sums them to create an analog signal to be transmitted (TX). The analog signal is low-pass filtered at block TRFIL 56.

Figure 1:
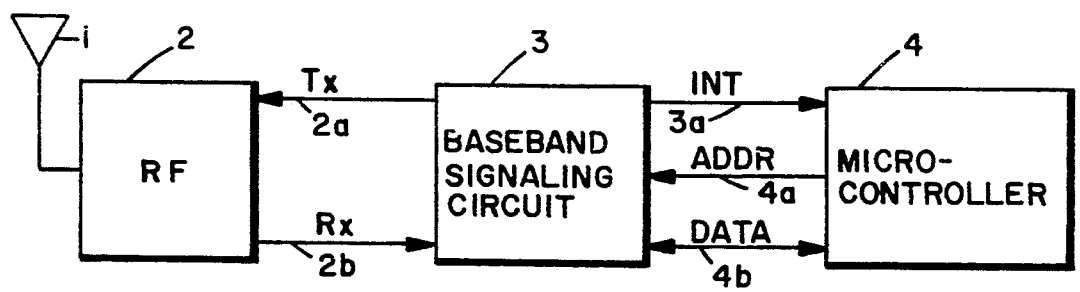
FIG. 1 is a simplified block diagram of a cellular telephone.

A Post-Filter (POSTFIL) 58 attenuates the clock frequency noise in the output signals. The output of POSTFIL 58 is connected to output pin DO 60 and is provided to the RF block 2 (FIG. 1).

The Interface 40 includes Address signal lines (A0, A1) and a Select signal line (XCS) whereby the microcontroller 4 can select specific ones of the circuit 10 registers. The Interface 40 also includes a Read Strobe (XRD) and a Write Strobe (XWR), in addition to the Interrupt signal line (INT). These various Interface signal lines operate, in conjunction with the eight bit data bus (D0–D7), in a conventional fashion, and allow the microcontroller 4 access to the internal registers of the circuit 10.

One significant difference between the AMPS and the TACS protocols is the signalling bit rate. On AMPS the signalling bit rate is ten kbit/s, and on TACS the signalling bit rate is eight kbit/s. Selection is made by one control bit in CREG 12, by changing clock division in CLOCKDIV 14 to change the output clocks to other blocks and, thus, consequently the operational frequency of the other blocks.

According to the present invention, the above-described AMPS/TACS signalling circuit shown in FIGS. 2a and 2b is modified to be operable also with NAMPS/NTACS narrow band voice channels, and to thus operate also with subaudible signalling. Generally, the signalling circuit of FIGS. 2a and 2b is reconstructed so that it can receive and transmit a 200 bit/s data stream, to have a flexible interface to the microcontroller, and to have the microcontroller 4 interpret the data contents.

Significantly, the reconstructed circuit does not use the SAT signal blocks (SAT signal path) to receive the Digital SAT (DSAT), but instead employs the data signal path to receive (and transmit) both DSAT and data messages (data messages: WSYNC+DATA WORD).

Figure 4A:
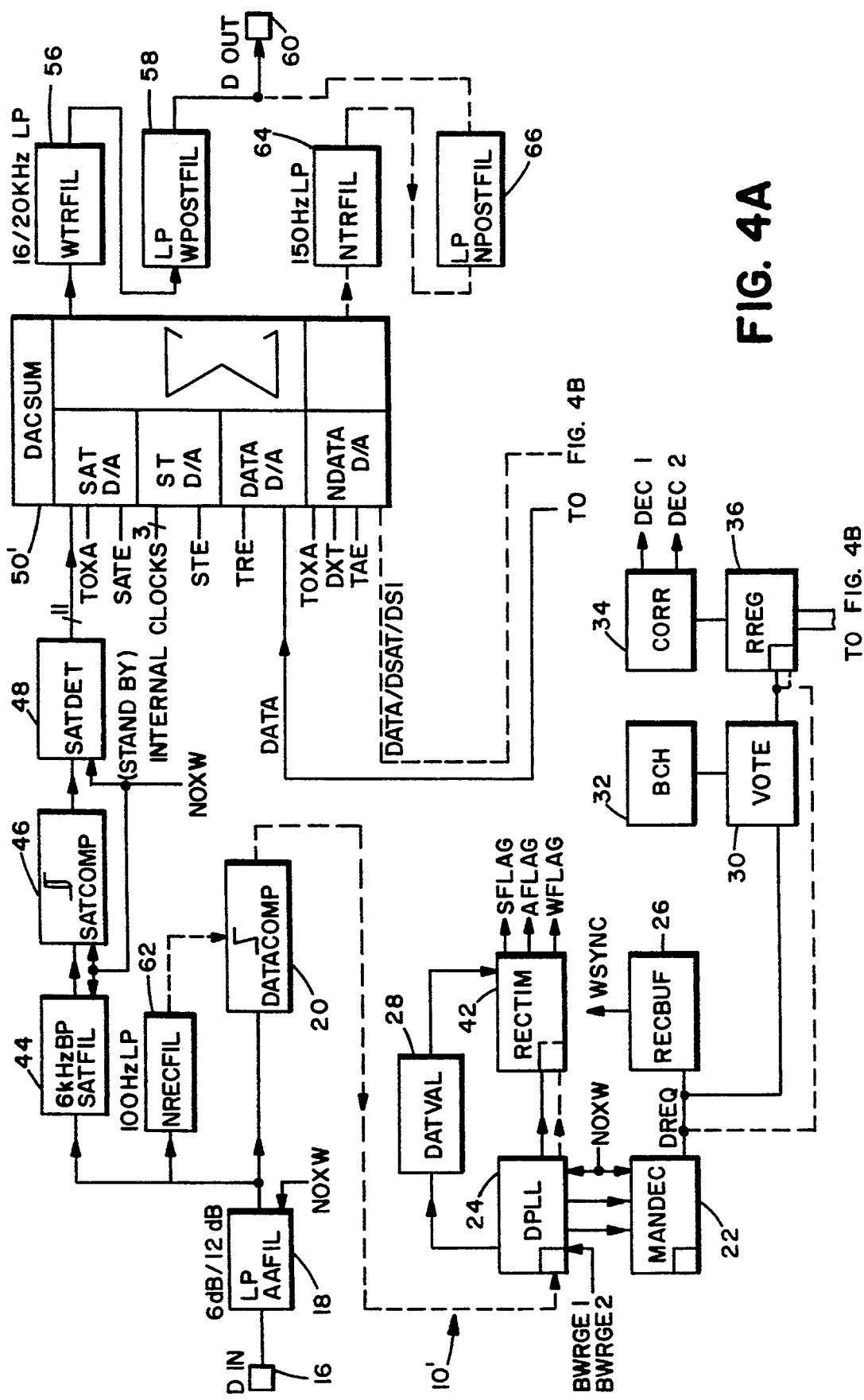
FIGS. 4A and 4B are a block diagram of a multimode AMPS/TACS and NAMPS/NTACS signaling circuit that is constructed and operated in accordance with the invention.
Figure 4B:
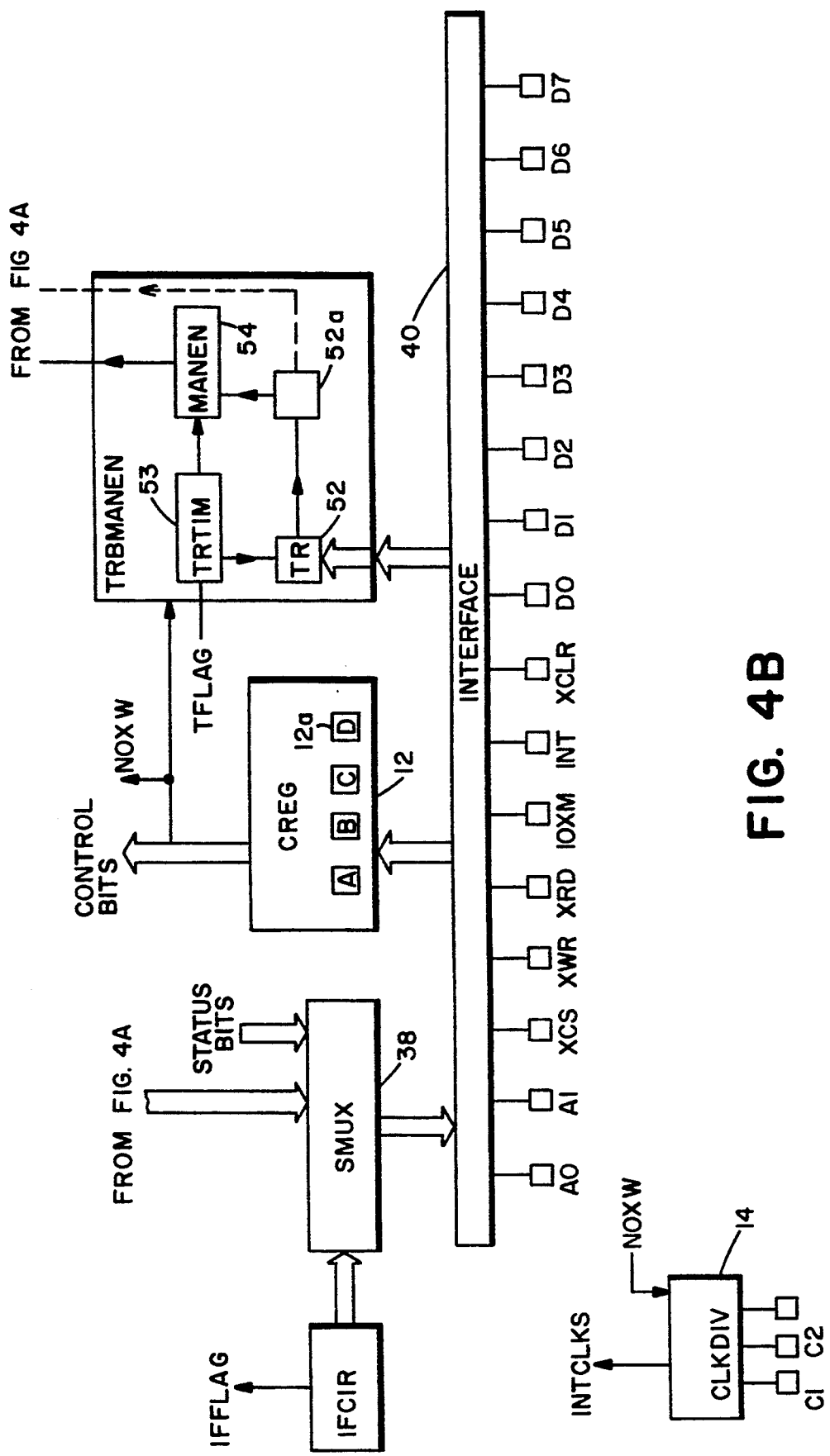

FIGS. 4A and 4B are a block diagram of a presently preferred embodiment of the signalling circuit 10'. Signal paths employed for subaudible signaling are marked with a broken line, and blocks that function for AMPS/TACS operation as in FIGS. 2a and 2b are similarly numbered.

CREG 12 includes one additional 8-bit control register REG 12a for controlling the circuit 10' in the NAMPS/NTACS mode. The mode of operation is selected by a control bit (NOXW) in control register 12a. Control bit NOXW is distributed throughout the circuit 10' and influences the operation of most of the blocks, changing the operation from wide band signaling to narrow band signaling. The following table shows the contents of the control register REG 12a:

| Bit Position | Name | Description |
| --- | --- | --- |
| D(n) | NOXW | Narrow band or Wide band of selection |
| D(n + 1) | ISEL80X1 | Interrupt interval selection (1 or 8 bits) |
| D(n + 2) | BWRGE1 | Bandwidth range selection for DPLL 24 |
| D(n + 3) | BWRGE2 | Bandwidth range selection for DPLL 24 |
| D(n + 4) | DTX | Discontinuous transmission selection |

The operation of Control bits ISEL8OX1, BWRGE1, BWRGE2 and DTX is described in detail below.

It should be noted that control bit NOXW changes the CLOCKDIV 14 divisions so that the CLOCKDIV output clocks are of a reduced frequency, thus changing the operational frequency of the circuit 10' from the AMPS/TACS 10/8 kHz range to the NAMPS/NTACS 200 Hz range.

RECEIVING of Subaudible Signalling

The incoming NAMPS/NTACS signal (RX) appearing at node DIN 16 is first low pass filtered in block AAFIL 18. In the NAMPS/NTACS narrow band mode the AAFIL 18 has a 12 dB passband gain, as opposed to 6 dB in the AMPS/TACS embodiment of FIG. 2. NRECFIL 62 functions as a 100 Hz low pass filter, filtering out the incoming voice signal and noise. The operation of NRECFIL 62 is described in greater detail in commonly assigned U.S. patent application Ser. No. 07/893,752, filed on even date herewith, entitled "A Switched Capacitor Decimator", by J. Pikkarainen now U.S. Pat. No. 5,289,059, issued Feb. 22, 1994.

The data is converted to digital form in DATA-COMP 20, as in the wideband mode. The data is applied to DPLL 24 where the data is synchronized to the internal digital clock. DPLL 24 is employed to generate a bit rate clock to clock the data, and also to clock all receiver blocks. The nominal DPLL 24 center frequency in wide band mode is 10/8 kHz, and is changed by the control signal NOXW to 200 Hz in the narrow band NAMPS/NTACS mode.

Additionally, in the narrow band mode, the CREG 12 bits BWRGE1 and BWRGE2 are used to select the bandwidth (locking range around the center frequency) of the DPLL 24 according to the following table (Fc=nominal center frequency).

| BWRGE2 | BWRGE1 | NAMPS bandwidth | NTACS bandwidth |
|---|---|---|---|
| 0 | 0 | Fc +/− 1.56 Hz | FC +/− 1.56 Hz |
| 0 | 1 | Fc +/− 3.125 Hz | FC +/− 3.125 Hz |
| 1 | 0 | Fc +/− 6.25 Hz | FC +/− 6.25 Hz |
| 1 | 1 | Fc +/− 12.5 Hz | FC +/− 12.5 Hz |

From the DPLL 24 the synchronized 200 bit/s data stream is input to the MANDEC 22. The MANDEC 22 is used as a Manchester Decoder in the wide band mode, but in the narrow band mode is operated instead as a bit integrator. The MANDEC 22 obtains several samples from each received bit (symbol) and determines whether a zero or a one bit is received. The function of the integration is to minimize the effect of noise and distortion in the received data. Also, the effect of jitter in the data can be minimized, for example, by handling the samples in the mid-area of the bit in a different manner (weighing factors) as compared to samples on side areas of the bit.

More specifically, in the wide band mode the MANDEC 22 converts the Manchester coded data to NRZ data by integrating the ex-or of the Manchester coded data (RECDXQ) and the clock generated by the DPLL 24 (QREC) over one QREC period (from one rising edge of QREC to the next). The integration is accomplished by sampling the ex-or output at a rate of 320 kHz for TACS and 400 Khz for AMPS, which yields 40 samples per bit period. An internal six bit counter counts the number of samples wherein the ex-or output is high. A count of 20 or greater results in a one at the output (DREC). A count of less than 20 results in zero. The converted NRZ data is available at the DREC output during the QREC period following the decoded period.

Figure 6:
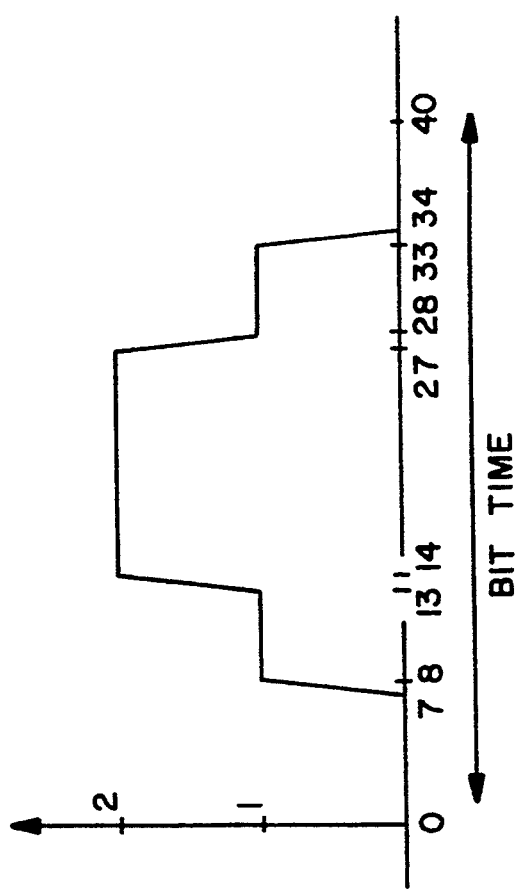
FIG. 6 illustrates a weighting function employed for bit integration in the NAMPS/NTACS modes of operation.
Figure 7:
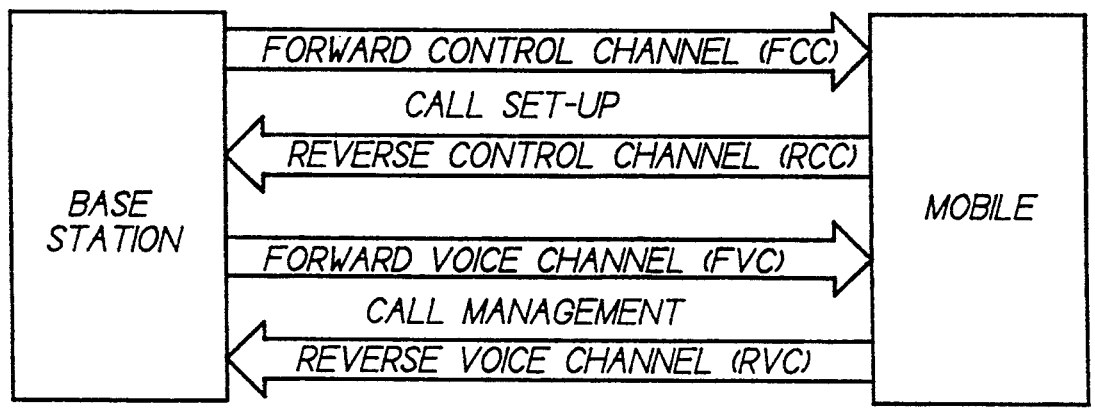
FIG. 7 illustrates Forward and Reverse channel signalling protocol.
Figure 8:
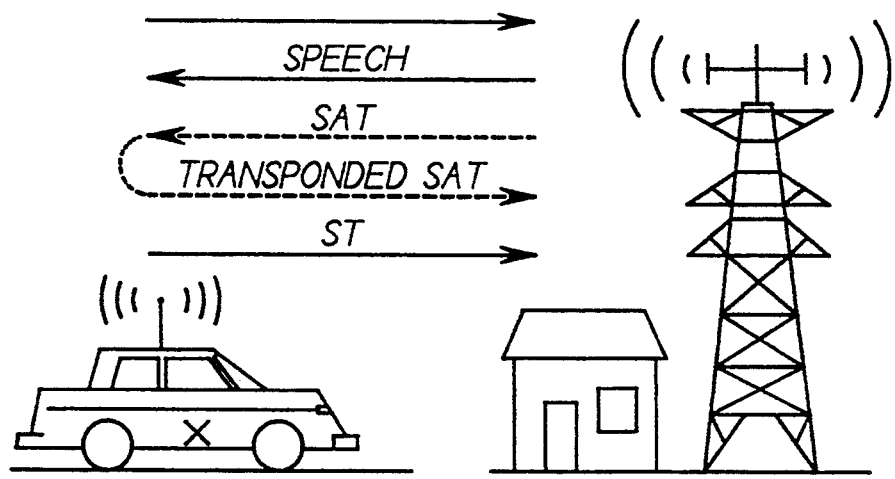
FIG. 8 illustrates SAT and ST signalling protocol.

In the narrow band mode Manchester decoding is inhibited. All incoming bits are treated as NRZ bits having a baud rate of 200 bits/s. A logic one at input RECDXQ enables the six bit counter to count. The sampling rate is 8 kHz, i.e. 40 samples per bit period. In the narrow band mode a weighting function specifies increments of the integrator counter, as seen in FIG. 6. More specifically, FIG. 6 illustrates a weighting function h(n) of integration wherein:

h(n)=0, when n=1,2,3,4,5,6,7,34,35,36,37,38,39,40;
h(n)=1, when n=8,9,10,11,12,13,28,29,30,31,32,33; and
h(n)=2, when n=14,15,16,17,18,19,20,21,22,23,24, 25,26,27.

A decided data bit y(k) is given by:

$$y(k) = \sum_{n=1}^{40} h(n)*x(40k - nk),$$

where x is a sample of the input data.

Figures 3, 5:
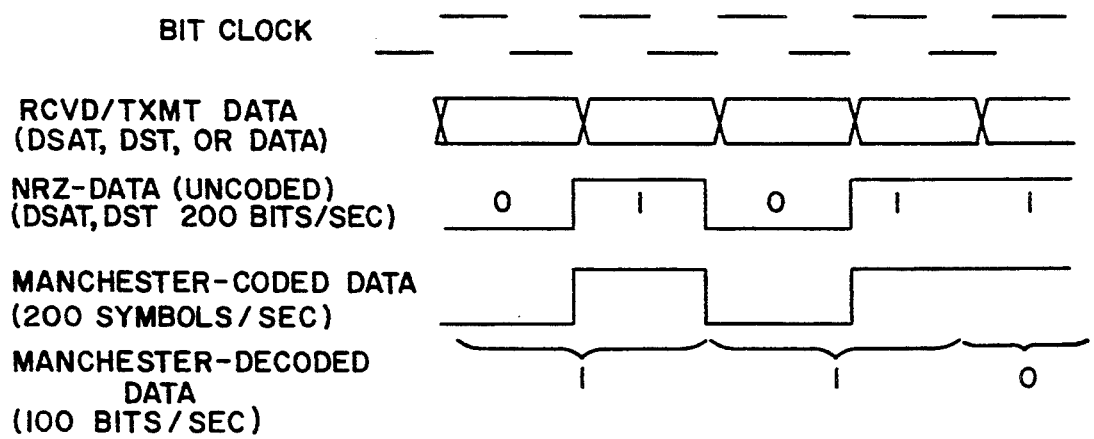
FIG. 3 illustrates a frame structure for NAMPS/NTACS signaling protocols.
FIG. 5 shows the principle of Manchester-coding compared to a NRZ-signal.

It should be noted that all received data, including DSAT, WSYNC, and DATA WORD, is processed in similar manner; as a 200 bit/s bit stream. That is, although the DATA WORD is 100 bit/s Manchester coded, and DSAT and WSYNC are each 200 bit/s NRZ coded, the 100 bit/s Manchester coded data may be interpreted also as 200 symbols/s data. FIG. 5 shows a clarifying example of this technique. All bit streams in the MANDEC 22, and also in subsequent blocks, are processed as a 200 bit/s stream. At the microcontroller 4, the bit streams are interpreted differently, as will be described.

RREG 36, which is used in the wide band mode to buffer the received (and 3/5 voted and BCH-decoded) data word as 28 bits+additional status bits, is also used as a data buffer in the narrow band mode. The 200 bit/s bit stream (DSAT, WSYNC or DATA WORD) from MANDEC 22 is directly shifted to RREG 36 without any further processing. From RREG 36 the received data bits are output to the microcontroller 4 for interpretation, after the generation of an interrupt by RECTIM 42.

RECBUF 26, which is used in the wide band mode to detect the 11-bit synchronization pattern, is not used in the narrow band mode, i.e. the output status bit (WS, or WSYNC, in FIG. 2) is ignored. If desired, RECBUF 26 may be used to detect the 30-bit NAMPS/NTACS WSYNC pattern, by providing a suitable buffer length (1–30 bits) and appropriate detection logic.

DATVAL 28, which is used in the wide band mode to detect if data is being received, is also not used in the narrow band mode, i.e. the output status bit (DFLAG in FIG. 2) is ignored. However, this function also may be used, if desired, with the 200 bit/s stream to detect the quality of the received signal.

Blocks VOTE 30, BCH 32 and CORR 34, which are used in the wide band mode to 3/5 majority vote the received data repeats and to BCH-decode the data word, are also not used in the narrow band mode. In the narrow band signalling protocol there are no repeats, thus the VOTE block 30 is not required. Blocks BCH 32 and CORR 34 could be employed to BCH-decode the DATA WORD, thereby performing this function with the signalling circuit 10', instead of the microcontroller 4.

Also, the SAT detection signal path (SATFIL 44, SATCOMP 46, SATDET 48) is not used in the narrow band mode, and is preferably set by the control signal NOXW to a stand-by mode of operation to reduce current consumption.

The microcontroller 4, which receives the data via SMUX 38 and Interface 40, uses several interrupt and status flags when receiving wide band (AMPS/TACS) channels. DFLAG is used to supervise the quality of received data, SFLAG is used to supervise frame synchronization, RFLAG is used to indicate that a new repeat has been received, and WFLAG to indicate that the entire word (several repeats) has been received.

For the narrow band voice channels, only one receiving flag, for example WFLAG, is used to cause an interrupt and to indicate to microcontroller 4 that it should read data from the signalling circuit 10'. Other flags, for example DFLAG, could also be used, although only one flag signal is necessary.

The bit content of the data received by the microcontroller 4 is analyzed in accordance with the format shown in FIG. 3 and, if DSAT is indicated, the data is transponded to the transmitter. In the case of a WSYNC and a DATA WORD pattern, DATA WORD is Manchester-decoded and BCH-decoded in the microcontroller 4, and appropriate actions are taken.

When employing the narrowband voice channels, the interrupt mechanism (generated in block RECTIM 42) and data transfer method from the signalling circuit 10' to the microcontroller 4 provides a flexible interface. If desired, the same method may be employed for the wideband channels. Preferably, an interrupt is generated with WFLAG after every eight bits. In response, the microcontroller 4 reads the byte from the RREG 36 block and the interrupt is removed.

For the case of 200 bits/s signalling, the time to accumulate eight bits can be substantial (40 ms for DSAT and WSYNC, 80 ms for DATA WORD). However, in advance information from the first received bits is required. Thus, a timing and interrupt modification is provided, implemented by control bit ISEL8OX 1. When ISEL8X1 is set to one (high), the interrupt interval, or cycle, is eight bits. When this bit is set to zero (low), the interrupt cycle is set to only one bit, and data may be read into the microcontroller 4 bit by bit. The interrupt cycle selection is modifiable during operation, so that the microcontroller 4 may select the interrupt cycle which is the most optimum for a given circumstance.

For example, if DSAT is received during the normal condition (narrow band), an 8-bit interrupt cycle is the most convenient, as it does not require the microcontroller 4 to service the interrupt at a rapid rate, thereby releasing the microcontroller 4 for other operations. However, if, for example, DSAT is lost or is being tracked for the first time after setting the voice channel, or if there are bit errors, or if DSAT is changing to WSYNC and DATA WORD, or any other similar operation is occurring, the 1-bit interrupt cycle may be the most optimum mode of operation.

In the 1-bit interrupt cycle mode the signalling circuit 10' provides a mechanism to accommodate the case where the microcontroller 4, for some reason, cannot service every interrupt. If the bit interrupt occurs, and the bit is not read before the next bit is received (and a new interrupt occurs, or the previous interrupt flag remains active), the received bits are serially shifted into the 32-bit RREG 36 and stored. As a result, the bits may be read by the microcontroller 4 one by one, or in groups of 2, 3, 4, . . . , or in any group up to eight bits in length (the width of the interface 40 data bus).

In summary, in the receiving mode for subaudible signalling, a single control bit (NOXW) causes the passbands of the filter blocks to be changed to a value suitable for a 200 bit/s rate, the DPLL 24 center frequency is reduced from 10/8 kbits/s to 200 bits/s, the Manchester decoder 22 operates as a bit integrator, and the receiver register 36 is used to buffer the serial data before transferring the data to microcontroller 4. All other functions associated with the wide band mode may be set to stand-by, or they may be employed to enhance the operation of the circuit 10' by reducing the processing burden of the microcontroller 4.

TRANSMITTING of Subaudible Signalling

For AMPS signalling, speech is nominally modulated with a deviation of 8.0 kHz, with a maximum deviation of up to 12 kHz. In comparison, the SAT is deviated by only a relatively small amount (+/−2.0 kHz). All data is sent at 10 kilobits per second and is modulated onto the carrier using Frequency Shift Keying (FSK) with a deviation of 8.0 kHz. The 10 kHz signalling tone (ST) is also modulated with 8.0 kHz deviation. The filtered wideband data stream is employed to modulate the carrier using direct binary FSK. A one (high) into the modulator corresponds to a nominal peak frequency deviation that is 8.0 kHz above the carrier frequency. A zero (low) into the modulator corresponds to a nominal peak frequency deviation that is 8.0 kHz below the carrier frequency.

For subaudible signalling, data to be transmitted is loaded by the microcontroller 4 into the signalling circuit 10' transmitter register TR 52 in 8-bit increments. From TR 52 the data is serialized (block 52a), and then input to the NDATA D/A converter of DACSUM 50'. In the signalling circuit 10', all transmitted data is processed as 200 bits/s, including DSAT, DST, WSYNC and DATA WORD. Thus, in that DSAT, DST and WSYNC are NRZ-coded, they are loaded as they are (pure bit stream) from the microcontroller 4 to the signalling circuit 10'. However, DATA WORD (100 bits/s) is Manchester-coded (to be 200 symbols) in the microcontroller 4 before being loaded into the signalling circuit 10'.

Thus, the operation of the transmitter in the narrow band mode of operation is similar to the operation in the wide band mode, except for the following distinctions.

The Manchester-encoder block MANEN 54 is by-passed, the bypass being controlled by the control bit NOXW.

The bit rate is reduced from 10/8 kbits/s to 200 bits/s, by changing the clock frequency from CLOCKDIV 14 to the transmitter blocks. The clock change is also controlled by control bit NOXW.

In both modes (narrow band and wide band) the data loading is timed by a Transmit Interrupt Flag, TFLAG. When TFLAG is high, the signalling circuit 10' indicates that it is ready to load a new byte from microcontroller 4.

The transmitted sub-audible analog signalling data output by the NDATA D/A of DACSUM 50' is filtered in a low pass filter NTRFIL 64 (bandwidth 150 Hz) to remove the higher spectrum contents within the audio band. Block NPOSTFIL 66 attenuates any clock frequency noise in the output signal. The output of NPOSTFIL 66 is applied to the output node 60 and thus to the RF block 2 for transmission.

In summary, for the subaudible signalling transmitter operation, the single control bit (NOXW) causes the Manchester encoder to be by-passed, the bit rate to be reduced to 200 bits/s, and the D/A converter and filter blocks passbands to be changed so as to be suitable for the 200 bits/s rate.

In accordance with an aspect of the invention, the Control bit NOXW preferably sets all unnecessary signal blocks, including certain of the analog filter blocks, to a standby mode. This is accomplished by resetting these blocks, or by inhibiting their input clock signals. The current consumption in the narrow band mode is thus less than in the wide band mode (voice channel), mostly as a result of setting blocks SATDET 48 and DATVAL 28 in a low power mode. As can be appreciated, the reduction in power consumption of a mobile telephone is an important consideration, in that battery life is extended.

The level of the transmitted signal, and the corresponding transmission deviation, are now described.

The level of the transmitted subaudible signalling data is selected in block DACSUM 50', by control bits NOXW (narrow/wide band), TOXA (TACS/AMPS selection) and DTX (Discontinuous Transmission), all of which originate from CREG 12. On the NAMPS/NTACS voice channels, and during so called discontinuous transmission (DTX), the transmitted signal deviation at the antenna 1 is changed, and the transmitted power is decreased.

Discontinous transmission refers to the ability of a mobile station to switch autonomously between two transmitter power level states while the mobile station is in a conversation state on a voice channel.

Changing the signal deviation in the transmitter is accomplished by changing the analog signal level at the signalling circuit 10' output node, DOUT 60, according to the following criteria.

Output levels at DOUT 60 in the wide band mode operating condition (NOXW=0):
ST=2.3 Vpp
WIDE BAND DATA=2.3 Vpp
SAT=610 mVpp (TACS)
SAT=575 mVpp (AMPS)

Output levels at DOUT 60 in the narrow band mode (NOXW=1):
NARROW BAND DATA=201 mVpp (AMPS, DTX=0)
NARROW BAND DATA=252 mVpp (TACS, DTX=0)
NARROW BAND DATA=804 mVpp (AMPS, DTX=1)
NARROW BAND DATA=1004 mVpp (TACS, DTX=1)

The output level change control within the signalling circuit 10', between the AMPS and TACS mode, is a useful feature. However, the level selections, and thus the deviation control in the NAMPS/NTACS modes, and even more specifically during DTX conditions, are very useful and provide advantages over conventional systems.

That is, this aspect of the invention relates to a frequency deviation change when the channel is changed on the same system (for example from the AMPS voice channel to the NAMPS voice channel, or when discontinuous transmission is used on AMPS/TACS or NAMPS/NTACS voice channels) during normal operation. In other words, this aspect of the invention provides a method to change the transmitted frequency deviation during a telephone conversation.

Furthermore, by changing only a few control bits the deviation is varied, thereby eliminating a need to add additional components, such as RF components, for level selection. This solution saves area, component costs, and current consumption in the telephone.

A presently preferred specification for the transmitted signal deviation is as follows:

| | | | |
|---|---|---|---|
| AMPS | Data +/− 8.0 kHz | SAT +/− 2.0 kHz | ST +/− 8.0 kHz |
| TACS | Data +/− 6.4 kHz | SAT +/− 1.7 kHz | ST +/− 6.4 kHz |
| NAMPS | +/− 700 Hz (DSAT, DST, WSYNC, DATA WORD) | | |
| NAMPS/DTX | +/− 2.8 kHz (DST transmitted, instead of DSAT) | | |
| NTACS | +/− 700 Hz (DSAT, DST, WSYNC, DATA WORD) | | |
| NTACS/DTX | +/− 2.8 kHz (DST transmitted, instead of DSAT) | | |

The mobile phone's transmitter is implemented in such a manner that, for the previously mentioned signalling circuit 10' output levels at DOUT 60, a specified deviation occurs in the transmitted signal. For example, in AMPS with a WIDE BAND DATA signal at DOUT 60, a signal level of 2.3 Vpp produces 8.0 kHz deviation in the transmitted signal. Correspondingly, in the TACS mode with a WIDE BAND DATA signal at DOUT 60, a signal level of 2.3 Vpp will produce 6.4 kHz deviation in the transmitted signal, as specified above.

According to the present invention, the AMPS/TACS signalling circuit of FIG. 2 is modified as in FIG. 4 to also be operable for NAMPS/NTACS cellular telephone systems that employ narrow band voice channels and subaudible signalling. The modified signalling circuit is thus enabled to also receive and transmit subaudible signalling protocols, in conjunction with the microcontroller 4.

The embodiment of FIGS. 4A and 4B does not require a significant number of additional components, or more than a few additional internal blocks, and thus overcomes the disadvantages of described prior art technology. The presently preferred embodiment, through the use of a single control signal (NOXW), is enabled to switch between AMPS/TACS and NAMPS/NTACS signalling protocols and thus provides savings in cost, area, and power consumption.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

APPENDIX A

There are four signalling paths used in the AMPS network.

The Forward Control Channels (FCC) and Reverse Control Channels (RCC) are used to set up calls and manage the mobiles on the system. They are not used for conversation.

The Forward Voice Channel (FVC) and Reverse Voice Channel (RVC) are used for managing the calls. Data is transmitted on these channels before, after and during the call. The speech path is muted during the bursts of data to prevent annoyance to the calling parties.

Speech, Data and Supervisory tones are transmitted over the network, each with particular modulation characteristics.

A feature of the AMPS system is the use of two supervisory tones. These are sent over an assigned voice channel.

The first tone is referred to as SAT (Supervisory Audio Tone) and is generated by the base station and transponded by the mobile to form a closed loop. Three SAT tones are available for indentification (5970, 6000 & 6030 Hz).

The second tone is called ST (Signalling Tone) and is a 10 kHz tone generated by the mobile when the handset is in place (on-hook), it is not sent when off-hook ST is sent over the voice channel until the handset is picked up. It is also sent for a period of 1–8 seconds at clear-down of a call, also for a period of 0–4 seconds if a three-way conversation is requested.

3.7.1 FORWARD CONTROL CHANNEL

The forward control channel (FOCC) is a continuous wideband data stream sent from the land station to the mobile station. This data stream must be generated at a 10 kilobit/second =0.1 bit/second rate. FIG. 3.7.1-1 depicts the format of the FOCC data stream.

A 10-bit dotting sequence (1010101010) and an 11-bit word sync sequence (11100010010) are sent to permit mobile stations to achieve synchronization with the incoming data. Each word contains 40 bits, including parity, and is repeated five times; it is then referred to as a word block. For a multi-word message, the second word block and subsequent word blocks are formed the same as the first word block including the 10-bit dotting and 11-bit word sync sequences. A word is formed by encoding 28 content bits into a (40, 28) BCH code that has a distance of 5, (40, 28; 5). The left-most bit (i.e., earliest in time) shall be designated the most-significant bit. The 28 most-significant bits of the 40-bit field shall be the content bits.

2.7.1 REVERSE CONTROL CHANNEL—REQUIREMENT FOR 32-DIGIT DIALING OPTION

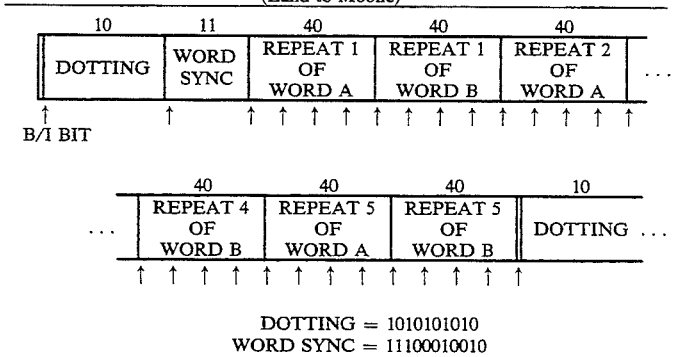

FIG. 3.7.1-1. FORWARD CONTROL CHANNEL MESSAGE STREAM (Land-to-Mobile)

DOTTING = 1010101010
WORD SYNC = 11100010010

NOTES:
1. A given mobile reads only one of the two interleaved messages (A or B).
2. Busy-Idle bits are inserted at each arrow.

Each forward control channel consists of three discrete information streams, called stream A, stream B, and busy-idle stream, that are time-multiplexed together. Messages to mobile stations with the least significant bit of their mobile identification number (see 2.3.1) equal to '0' are sent on stream A, and those with the least-significant bit of their mobile identification number equal to '1' are sent on stream B.

The busy-idle stream contains busy-idle bits, which are used to indicate the current status of the reverse control channel. The reverse control channel is busy if the busy-idle bit is equal to '0' and idle if the busy-idle bit is equal to '1'. A busy-idle bit is located at the beginning of each dotting sequence, at the beginning of each word sync sequence, at the beginning of the first repeat of word A, and after every 10 message bits thereafter.

The reverse control channel (RECC) is a wideband data stream sent from the mobile station to the land station. This data stream must be generated at a 10 kilobit/second=1 bit/second rate. FIG. 2.7.1-1 depicts the format of the RECC data stream.

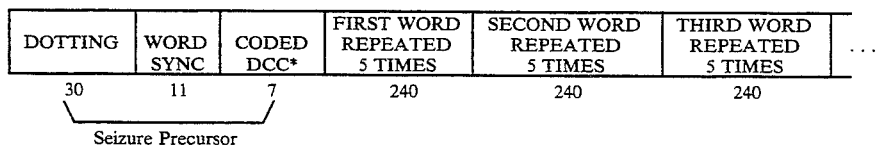

FIG. 2.7.1-1. REVERSE CONTROL CHANNEL MESSAGE STREAM (Mobile-to-Land)

DOTTING = 1010 ... 010
WORD SYNC = 11100010010

*DIGITAL COLOR CODE

All messages begin with the RECC seizure precursor that is composed of a 30-bit dotting sequence (1010 ... 010), an 11-bit word sync sequence (11100010010), and the coded digital color code (DCC). The 7-bit coded DCC is obtained by translating the received DCC.

3.7.2 FORWARD VOICE CHANNEL

The forward voice channel (FVC) is a wideband data stream sent by the land station to the mobile station. This data stream must be generated at a 10 kilobit/-second±0.1 bit/second rate. FIG. 3.7.2-1 depicts the format of the FVC data stream.

FIG. 3.7.2-1. FORWARD VOICE CHANNEL MESSAGE STREAM (Land-to-Mobile)

| DOTTING | W.S. | REPEAT 1 OF WORD | DOT. | W.S. | REPEAT 2 OF WORD | ... |
|---|---|---|---|---|---|---|
| 101 | 11 | 40 | 37 | 11 | 40 | |

| ... | DOT. | W.S. | REPEAT 9 OF WORD | DOT. | W.S. | REPEAT 10 OF WORD | DOT. | W.S. | REPEAT 11 OF WORD |
|---|---|---|---|---|---|---|---|---|---|
| | 37 | 11 | 40 | 37 | 11 | 40 | 37 | 11 | 40 |

DOTTING = 1010 ... 101
W.S. (WORD SYNC) = 11100010010

A 37-bit dotting sequence (1010 ... 101) and an 11-bit word sync sequence (11100010010) are sent to permit mobile stations to achieve synchronization with the incoming data, except at the first repeat of the word, where the 101-bit dotting sequence is used. Each word contains 40 bits, including parity, and is repeated eleven times together with the 37-bit dotting and 11-bit word sync sequences; it is then referred to as a word block. A word is formed by encoding the 28 content bits into a (40, 28) BCH code that has a distance of 5, (40, 28; 5). The left-most bit (i.e., earliest in time) shall be designated the most-significant bit. The 28 most-significant bits of the 40-bit field shall be the content bits. The generator polynomial is the same as that used for the forward control channel.

2.7.2 REVERSE VOICE CHANNEL

The reverse voice channel (RVC) is a wideband data stream sent from the mobile station to the land station. This data stream must be generated at a 10 kilobit/second±1 bit/second rate. FIG. 2.7.2-1 depicts the format of the RVC data stream.

FIG. 2.7.2-1. REVERSE VOICE CHANNEL MESSAGE STREAM (Mobile-to-Land)

| DOTTING | W.S. | REPEAT 1 OF WORD 1 | DOT. | W.S. | REPEAT 2 OF WORD 1 |
|---|---|---|---|---|---|
| 101 | 11 | 48 | 37 | 11 | 48 |

| DOT. | W.S. | REPEAT 3 OF WORD 1 | DOT. | W.S. | REPEAT 4 OF WORD 1 | DOT. | W.S. | REPEAT 5 OF WORD 1 |
|---|---|---|---|---|---|---|---|---|
| 37 | 11 | 48 | 37 | 11 | 48 | 37 | 11 | 48 |

| DOT. | W.S. | REPEAT 1 OF WORD 2 | ... | ... | REPEAT 5 OF WORD 2 |
|---|---|---|---|---|---|
| 37 | 11 | 48 | | | 48 |

DOTTING = 1010 ... 101
W.S. (WORD SYNC) = 11100010010

A 37-bit dotting sequence (1010 ... 101) and an 11-bit word sync sequence (11100010010) are sent to permit land stations to achieve synchronization with the incoming data, except at the first repeat of word 1 of the message where a 101-bit dotting sequence is used. Each word contains 48 bits, including parity, and is repeated five times together with the 37-bit dotting and 11-bit word sync sequences; it is then referred to as a word block. For a multi-word message, the second word block is formed the same as the first word block including the 37-bit dotting and 11-bit word sync sequences. A word is formed by encoding the 36 content bits into a (48, 36) BCH code that has a distance of 5, (48, 36; 5). The left-most bit (i.e., earliest in time) shall be designated the most-significant bit. The 36 most-significant bits of the 48-bit field shall be the content bits. The generator polynomial for the code is the same as for the (40,28: 5) code used on the forward control channel

What is claimed is:

1. A baseband signalling circuit for use with a cellular telephone that comprises a cellular telephone control means for selectively setting a state of a control signal line as a function of a received cellular communications system signalling protocol, said baseband signalling circuit being responsive to a first state of said control signal line for operating in accordance with a first cellular communications system signalling protocol that employs a signalling frequency that is greater than one kilo-Hertz, said baseband signalling circuit further being responsive to a second state of said control signal line for operating in accordance with a second cellular communications system signalling protocol that employs a signalling frequency that is less than one kilo-Hertz, said baseband signalling circuit further comprising means for recovering data bits from a received signal, said recovering means being responsive to the first state of said control signal line for sampling the received signal at a first sampling rate, said recovering means being responsive to the second state of said control signal line for sampling the received signal at a second sampling rate, wherein said first sampling rate is at least an order of magnitude greater than said second sampling rate.

2. A baseband signalling circuit as set forth in claim 1 wherein the first signalling protocol is selected from Advanced Mobile Phone Services (AMPS) and Total Access Communication System (TACS) signalling protocols, and wherein the second signalling protocol is selected from Narrowband Advanced Mobile Phone Services (NAMPS) and Narrowband Total Access Communication System (NTACS) signalling protocols.

3. A baseband signalling circuit as set forth in claim 1 and further including clock generator means that is responsive to said control signal line for generating clock signals having first frequencies for the first state of said control signal line and clock frequencies having second frequencies for the second state of said control signal line, and wherein said first frequencies are greater than said second frequencies.

4. A baseband signalling circuit for use with a cellular telephone that comprises a cellular telephone control means for selectively setting a state of a control signal line as a function of a received cellular communications system signalling protocol, said baseband signalling circuit being responsive to a first state of said control signal line for operating in accordance with a first cellular communications system signalling protocol that employs a continuous signalling frequency that is greater than one kilo-Hertz, said baseband signalling circuit further being responsive to a second state of said control signal line for operating in accordance with a second cellular communications system signalling protocol that employs a signalling frequency that is less than one kilo-Hertz, wherein the first cellular communications system signalling protocol is selected from Advance Mobile Phone Services (AMPS) and Total Access Communication System (TACS) signalling protocols, and wherein the second cellular communications system signalling protocol is selected from narrowband Advanced Mobile Phone Services (NAMPS) and Narrowband Total Access Communication System (NTACS) signalling protocols; said baseband signalling circuit further including decoder means, responsive to the first state of said control signal line, for operating as a Manchester decoder for decoding received AMPS/TACS data that is input into said baseband signalling circuit, said decoder means being responsive to the second state of said control signal line for operating as a one bit integrator for decoding received NAMPS/NTACS data that is input into said baseband signalling circuit.

5. A baseband signalling circuit as set forth in claim 4 and further including means, responsive to a first state of a second control signal that is generated by said control means, for generating an interrupt signal that indicates to said cellular telephone control means that eight bits of the received data has been decoded, said generating means being responsive to a second state of the second control signal for generating the interrupt signal to indicate that one bit of the received data has been decoded.

6. A baseband signalling circuit as set forth in claim 5 and further including means for storing one or more of the decoded bits prior to the decoded bits being output to the control means.

7. A baseband signalling circuit as set forth in claim 2 and further comprising circuit means for processing received signals associated with said AMPS and TACS signalling protocols, and wherein said baseband signalling circuit is responsive to the second state of said control signal line for setting said circuit means in a low power mode of operation.

8. A baseband signalling circuit as set forth in claim 4 wherein said decoder means, when operating as a one bit integrator, operates with a weighting function h(n) of integration wherein:

h(n)=0, when n=1,2,3,4,5,6,7,34,35,36,37,38,39,40;
h(n)=1, when n=8,9,10,11,12,13,28,29,30,31,32,33; and
h(n)=2, when n=14,15,16,17,18,19,20,21,22,23,24,25,26,27; and wherein
a decided data bit y(k) is given by:

$$y(k) = \sum_{n=1}^{40} h(n)*x(40k - nk),$$

where x is a sample of the input NAMPS/NTACS data.

9. A baseband signalling circuit for use with a cellular telephone, said baseband signalling circuit including first means for interfacing to a cellular telephone control means and second means for interfacing to a radio frequency reception and transmission means, said baseband signalling circuit being responsive to a first state of a control signal line for operating in accordance with Advanced Mobile Phone Services (AMPS)/Total Access Communication System (TACS) signalling protocols, said baseband signalling circuit further being responsive to a second state of said control signal line for operating in accordance with Narrowband Advanced Mobile Phone Services (NAMPS)/Narrowband Total Access Communication System (NTACS) subaudible signalling protocols, wherein the state of the control signal line is selectively controlled by said cellular telephone control means as a function of a received cellular communications system signalling protocol, wherein said first interface means includes a multi-bit data bus and an interrupt signal line that is coupled between said baseband signalling circuit and said cellular telephone control means, and wherein said baseband signalling circuit is responsive to information written over said data bus by said cellular telephone control means for selectively generating said interrupt signal on an occurrence of a reception of eight data bits from said second interface means or on an occurrence of a reception of one bit from said second interface means.

10. A baseband signalling circuit for use with a cellular telephone, said baseband signalling circuit including first means for interfacing to a cellular telephone control means and second means for interfacing to a radio frequency reception and transmission means, said baseband signalling circuit being responsive to a first state of a control signal line for operating in accordance with Advanced Mobile Phone Services (AMPS)/Total Access Communication System (TACS) signalling protocols, said baseband signalling circuit further being responsive to a second state of said control signal line for operating in accordance with Narrowband Advanced Mobile Phone Services (NAMPS)/Narrowband Total Access Communication System (NTACS) subaudible signalling protocols, wherein the state of the control signal line is selectively controlled by said cellular telephone control means as a function of a received cellular communications system signalling protocol, said baseband signalling circuit further comprising decoder means, responsive to the first state of said control signal line, for operating as a Manchester decoder for decoding AMPS/TACS data that is received from said radio frequency receiving means, said decoder means being responsive to the second state of said control signal line for operating as a one bit integrator for decoding NAMPS/NTACS Digital Supervisory Audio Tone (DSAT), Word Synchronization (WSYNC), and DATA WORD information that is received from said radio frequency receiving means.

11. A baseband signalling circuit as set forth in claim 10 wherein said decoder means, when operating as a one bit integrator, operates with a weighting function h(n) of integration wherein:

h(n)=0, when n=1,2,3,4,5,6,7,34,35,36,37,38,39,40;
h(n)=1, when n=8,9,10,11,12,13,28,29,30,31,32,33; and
h(n)=2, when n=14,15,16,17,18,19,20,21,22,23,24, 25,26,27; and wherein a decided data bit y(k) is given by:

$$y(k) = \sum_{n=1}^{40} h(n)*x(40k - nk),$$

where x is a sample of the input NAMPS/NTACS data.

12. A baseband signalling circuit as set forth in claim 10 wherein said second interface means includes means, responsive to information received from said cellular telephone control means, for varying a deviation of a radio frequency signal that is transmitted by said radio frequency transmitter means, wherein the information that is received from said cellular telephone control means includes the state of said control signal line and a state of a second control signal that indicates if a discontinuous transmission DTX mode of operation is in effect, and wherein the transmitted deviation is given as one of the group consisting of

| | | |
|---|---|---|
| AMPS Data | +/− 8.0 kHz SAT +/− 2.0 kHz ST +/− 8.0 kHz | |
| TACS Data | +/− 6.4 kHz SAT +/− 1.7 kHz ST +/− 6.4 kHz | |
| NAMPS | +/− 700 Hz (DSAT, DST, WSYNC, DATA WORD) | |
| NAMPS/DTX | +/− 2.8 kHz | |
| NTACS | +/− 700 Hz (DSAT, DST, WSYNC, DATA WORD) | |
| NTACS/DTX | +/− 2.8 kHz; | |
| | wherein SAT is a Supervisory Audio Tone and DST is a Digital Supervisory Tone | |

13. A baseband signalling circuit for use with a cellular telephone, said baseband signalling circuit including first means for interfacing to a cellular telephone control means and second means for interfacing to a radio frequency reception and transmission means, said baseband signalling circuit being responsive to a first state of a control signal line for operating in accordance with Advanced Mobile Phone Services (AMPS)/Total Access Communication System (TACS) signalling protocols, said baseband signalling circuit further being responsive to a second state of said control signal line for operating in accordance with Narrowband Advanced Mobile Phone Services (NAMPS)/Narrowband Total Access Communication System (NTACS) subaudible signalling protocols, wherein the state of the control signal line is selectively controlled by said cellular telephone control means as a function of a received cellular communications system signalling protocol, and wherein said baseband signalling circuit is further comprised of means for recovering data bits from a signal received from said second interface means, said recovering means being responsive to the first state of said control signal line for sampling the received signal at a first sampling rate, said recovering means being responsive to the second state of said control signal line for sampling the received signal at a second sampling rate, wherein said first sampling rate is at least an order of magnitude greater than said second sampling rate.

14. A baseband signalling circuit as set forth in claim 13 and further comprising digital phase lock loop (DPLL) means that is responsive to information received from said cellular telephone control means for varying a locking range about a center frequency of said DPLL means.

15. A baseband signalling circuit as set forth in claim 13 wherein said second interface means includes means, responsive to information received from said cellular telephone control means, for varying a deviation of a radio frequency signal that is transmitted by said radio frequency transmitter means.

16. A baseband signalling circuit as set forth in claim 15 wherein the information received from said cellular telephone control means includes the state of said control signal line and a state of a second control signal that indicates if a discontinuous transmission DTX mode of operation is in effect.

17. A baseband signalling circuit as set forth in claim 13 wherein said first interface means further comprises means for Manchester encoding information that is received from said cellular telephone control means prior to the information being applied to said second interface means for transmission by said radio frequency transmitter means.

18. A baseband signalling circuit as set forth in claim 17 and further including means, responsive to the second state of said control signal line, for bypassing said Manchester encoding means and for receiving Manchester encoded data from said cellular telephone control means through said first interface means.

* * * * *